Figure 1:
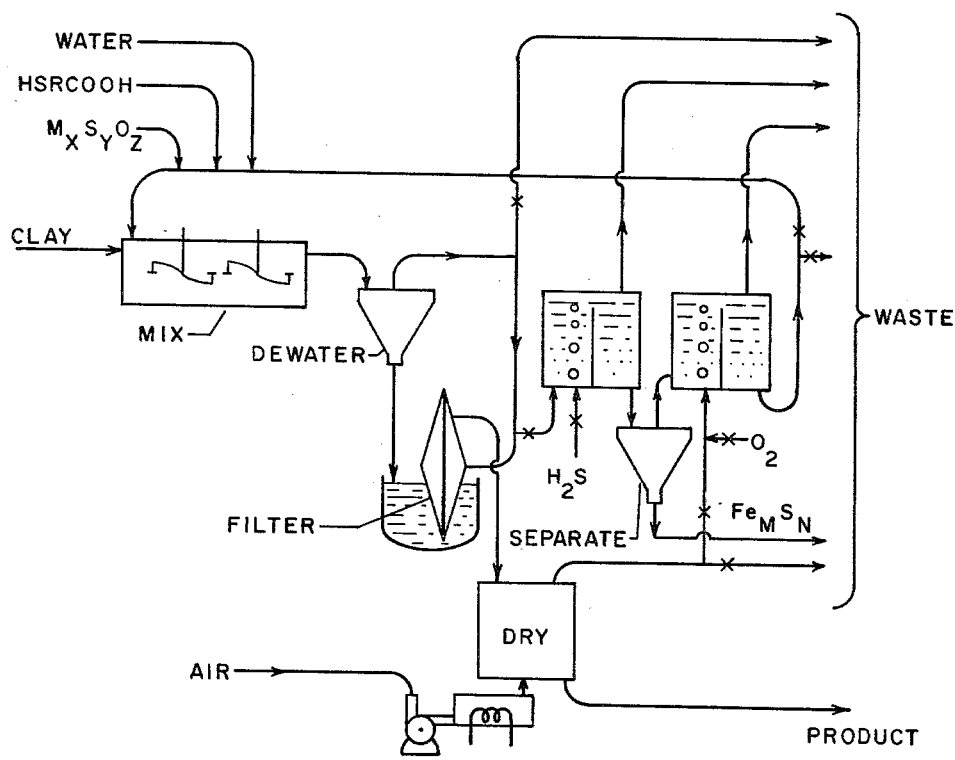

July 6, 1965 J. IANNICELLI ETAL 3,193,344
PROCESS FOR BLEACHING CLAY
Filed March 26, 1962

INVENTORS
JOSEPH IANNICELLI
PETER ABOYTES
BY *Brown & Rosen*

United States Patent Office 3,193,344
Patented July 6, 1965

3,193,344
PROCESS FOR BLEACHING CLAY
Joseph Iannicelli and Peter Aboytes, Borger, Tex., assignors to J. M. Huber Corporation, Locust, N.J., a corporation of New Jersey
Filed Mar. 26, 1962, Ser. No. 182,519
7 Claims. (Cl. 23—110)

This invention relates to treatment of clay and, more particularly, to an improved process of bleaching clay with a novel combination of chemical treating agents. It is known that the whiteness of clay can be improved by various bleaching agents. The amounts and costs of the agents required depends, however, generally on the amount of impurity to be removed; accordingly, the treatment of low color clays has, to date, been prohibitively expensive. Such has hindered the economic value and development of such type of clays.

In the usual or conventional processes for brightening clays, iron compounds initially solubilized from the clay remain in the aqueous portion of the clay slurry as simple water-soluble salts. These have a tendency to be re-adsorbed and remain with the clay product and produce, on drying, a clay of lower color. Such undesirable results are avoided according to the process of this invention.

It is, accordingly, one object of this invention to provide an improved process for the bleaching of clays whereby a large improvement in the color of the clay is obtained.

Another object is to provide a process for improving clays of low color which avoids the generation of objectionable fumes.

A further object of this invention is to provide a process for whitening clay in a particularly economic fashion.

Still other objects of this invention will be apparent to those skilled in the art on study of the disclosure hereinbelow.

The above and other objects of this invention are accomplished by treating an aqueous slurry of the clay to be bleached with a reducing agent and an iron binding agent generally describable as a water-soluble polyfunctional organic compound, one active group of which comprises a mercaptan (—SH) radical and another active group of which comprises a radical capable together with the mercaptan group of chelating iron. The characteristics of such agents which, with iron, form a complex readily and conveniently separated from the particles of clay are described below in detail.

In the preferred process, the reaction of clay and these agents is carried on at a slight degree of acidity. The crude clays may thus be treated, without the production of objectionable amounts of fumes, to obtain a clay of very greatly improved color. Any reducing agent active in the pH range of the liquor in which intended to be used to reduce ferric compound to ferrous compounds may be used. In the preferred embodiment, because of economic considerations, water-soluble salts of hydrosulphurous acid are preferably employed in the process of this invention. Salts which have proved to be particularly satisfactory for this purpose are sodium hydrosulphite, zinc hydrosulphite, and calcium hydrosulphite. The amount of hydrosulphite is small, on the order of less than 10 pounds per ton of clay, even when low color clays are used. Further, hydrosulphurous compounds, such as taught in U.S. Patent 2,339,594, page 1, column 2, lines 32–54 may be also used; e.g., alkali metal and zinc salts of hydrosulphurous acids and the sulfoxylates. By sulfoxylates is meant the compounds formed by the reaction of aldehydes with metal salts of hydrosulphurous acids; sodium hydrosulphite, zinc hydrosulphite, calcium hydrosulphite and the corresponding salts of formaldehyde sulfoxylate and hydrazine are used. Such compounds can be added in dry form or as aqueous solutions thereof to the slurry of clay to be treated. In order to illustrate this invention more clearly, modes of carrying the same into effect and advantageous results obtained thereby are given in the following examples; Examples A–1 through C–6 are summarized in Table I.

TABLE I

| Ex. No. | Low color | Crude slip pH [1] high color | Suprex | Other | Treating composition and characteristics | | | | | | G.E. brightness | | |
|---|---|---|---|---|---|---|---|---|---|---|---|---|---|
| | | | | | $M_2S_2O_4$ (2) | Alum (3) | M.A.A. (3) | Other reagents | pH | Color of liquor | Feed | Product | Change |
| A–1 | 5.7 | | | | .5 | 0.3 | 0 | 0 | | (4) L.G. | 70 | 79 | +9 |
| A–2 | 5.7 | | | | .5 | 0.3 | 2 | 0 | | 0 | 70 | 86 | 16 |
| A–3 | 5.7 | | | | .5 | 0.3 | 1 | 0 | 3.8 | 0 | 70 | 83 | 13 |
| A–4 | 5.7 | | | | .5 | 0 | 0 | HAc 10% | | (4) L.G. | 72 | 80 | 8 |
| A–5 | 5.7 | | | | .5 | 0 | 2 | 0 | | 0 | 70 | 81 | 11 |
| A–6 | 5.7 | | | | .5 | 0 | 4 | 0 | | 0 | 70 | 83.5 | 13.5 |
| A–7 | 5.7 | | | | .5 | 0 | 5 | 0 | | 0 | 70 | 85 | 15 |
| B–1 | | | 5.0 | | .5 | 0.3 | 0 | 0 | 4.7 | (4) L.G. | 77 | 82 | 5 |
| B–2 | | | 5.0 | | .5 | 0 | 5 | 0 | | 0 | 77 | 83 | 6 |
| B–3 | | | 5.0 | | .3 | 0 | 2 | 0 | | 0 | 77 | 82 | 5 |
| B–4 | | | 5.0 | | 1.0 | 0 | 0 | | | | 77 | 82 | 5 |
| C–1 | | | 6.7 | | .5 | 0.3 | 0 | | 3.8 | (4) L.G. | 82 | 85.5 | 3.5 |
| C–2 | | | 6.7 | | .5 | 0.3 | 2 | | 3.8 | 0 | 82 | 88 | 6 |
| C–3 | | | 6.7 | Froth [5] | .3 | 0.3 | 0 | | | (4) L.G. | 86 | 88 | 2 |
| C–4 | | | 6.7 | do | .3 | 0.3 | 1 | | | 0 | 86 | 90 | 4 |
| C–5 | | | | w.w. [6] | 0.5 | 0.3 | 0 | | | | 82 | 86.5 | 4.5 |
| C–6 | | | | do | 0.5 | 0.3 | 1.0 | | | | 82 | 90.3 | +8.3 |

[1] In 30% solid slurry.  [2] Percent of weight of solid feed.  [3] Mercapto acetic acid.  [4] Light green color.  [5] Forth floated clays.  [6] Water wash.

TABLE II

| Characteristics | Low-color crude | High-color crude | Suprex [1] | Fractionated |
|---|---|---|---|---|
| Percent $Al_2O_3$ | 39 | 39 | 37.9 | 37 |
| Percent $SiO_2$ | 44 | 45 | 44.9 | 43 |
| Percent $Fe_2O_3$ | 1.47 | .7 | 1.5 | 0.6 |
| Percent $TiO_2$ | 2.15 | 1.35 | 1.50 | 1.56 |
| pH value [2] | 5–6 | 6–7 | 4.5–5.5 | 4.5–5.0 |
| Particle size, percent, −2 microns | 69–74 | 62–68 | 87–92 | 90–94 |
| Particle size, percent, +5 microns | 8–11 | 12–15 | 3–5 | 0–1 |

[1] Registered trademark of J.M. Huber Corporation.
[2] As per part III, page 102 of "Kaolin Clays and Their Industrial Uses" J.M. Huber Corp., New York, 1955.

The product of Example A–3 gave the following analysis:

0.39% $Fe_2O_3$
1.81% $TiO_2$

Examples A–1 through A–7

2,400 grams of degritted low-color Georgia kaolin clay (G.E. brightness of 70 as measured at pages 96–79 of "Kaolin Clays and Their Industrial Uses," J. M. Huber Corporation, New York, 1955) of composition as in Table II was cut into eight equal portions. One 300-gram portion was mixed with 700 grams of water at 60° C. by a laboratory mixer in an open-topped upright cylindrical container open to the air and a uniform slurry was formed. The pH of this clay slurry was 5.7. Then 1.5 grams of sodium hydrosulfite and 0.9 gram of alum were added thereto. The mixing was continued for 30 minutes at 60° C. as in United States Patent 2,339,594. The odor of this reaction mixture was strong but not objectionable. The stirring energy of the laboratory mixer was sufficient to keep the clay particles in the reaction mixture suspended and agitated but insufficient to affect the particle size of the clay feed. The clay and liquor were then separated by filtration in the air, the clay recovered and dried at 90° C. to a moisture content of 1%, and the G.E. brightness determined as above.

The filtrate of the filtered reaction mixture was a liquor initially clear but it developed a definite turbidity and light green color as of ferrous hydroxide within a few minutes. This color gradually turned—in a period of 2 to 4 hours—to the reddish brown color characteristic of ferric hydroxide. Filtration of this liquor through laboratory filter paper provided thereon a reddish brown residue of hydrated ferric oxide. Data on this example are recorded in Table I as "Example A–1."

In Example A–2, a clay slurry was made up from a second 300-gram portion of the clay feed used in Example A–1. This portion was mixed and heated as in Example A–1 except that 7.5 cc. of an 800-gram per liter aqueous solution of mercaptoacetic acid was added thereto. The G.E. brightness of the clay product recovered and dried as in Example A–1 was determined as 86. The reaction mixture during the initial portion, as well as in the final portion of the 30-minutes reaction period, did not have an objectionable or strong odor although initially an odor was observable. The filtrate of the reaction mixture in this example was initially clear and colorless and remained so for a four-day period, far longer than the 2–4 hour period of time in which the filtrate of the reaction mixture in Example A–1 had become turbid and red colored. Data on this example are given as Example A–2 in Table I.

Example A–3 was parallel and identical to Examples A–2 and A–1 except that 3.75 cc. of the solution of mercaptoacetic acid was used; the pH of the reaction mixture of clay, treating agents, and water was 3.8. The reaction mixture, as in Example A–2, had an odor during the 30-minute reaction period that was observable but not objectionable. The filtrate of the reaction mixture was clear and colorless as in Example A–2. The G.E. brightness of the filtered clay product was 83 (determined as in Examples A–1 and A–2).

Example A–4 was run parallel and identical to Example A–3 except that 30 grams of acetic acid as 50% solution was used (in place of the mercaptoacetic acid and alum) on a low-color clay of initial G.E. brightness of 72. The G.E. brightness of the filtered and dried clay product was 80. This test shows that even such an amount of acid as would be uneconomical to use does not, even in combination with an amount of sulfurous salt which produces a maximum brightening effect for such salt, produce an improvement effect on brightening of clay as good as that produced by mercaptoacetic acid when used in amount only 10% of the weight of such other (acetic) acid.

Example A–5 was parallel and identical to Example A–1 except that 6 grams of mercaptoacetic acid of the above-mentioned 800 grams per liter solution was used in place of the alum. The filtrate from the reaction mixture was clear and had no color. The G.E. brightness of the filtered and dried clay product was 81. The reaction mixture of clay and treating agents had an odor during the reaction period that was noticeable but neither objectionable nor strong.

Example A–6 was run parallel and identical to Example A–5 except that 12 grams of mercaptoacetic was used. The filtrate from the reaction mixture had no color and was clear; the reaction mixture had an odor, as in Example A–5, that was noticeable but not objectionable or strong. The G.E. brightness of the filtered and dried clay product was 83.5.

Test A–7 was run parallel and identical to Example A–6 except that 15 grams of mercaptoacetic acid was used. The G.E. brightness of the filtered and dried clay product was 85.0. The filtrate from the reaction mixture was clear and had no color. The reaction mixture of clay and treating agents had an odor during the reaction period that was noticeable but neither objectionable nor strong, although the mercaptoacetic acid solution used had a strong but not objectionable odor as was also in the case of test A–6.

Examples B–1 through B–4

In Example B–1, 300 grams of a 1200-gram sample of Suprex clay (analysis given in Table II) having a G.E. brightness of 77 was admixed with 700 grams of water at 60° C., as in Example A–1. The pH of the resultant slurry was 5.0. Sodium hydrosulfite and alum were added to the slurry and admixed therewith for 30 minutes at 60° C., as in Example A–1. The pH of the resultant slurry was 4.2. Sodium hydrosulfite and alum were added to the slurry and admixed therewith for 30 minutes at 60° C. as in Example A–1. The pH of the resultant reaction mixture was 4.7. The G.E. brightness of the clay product (filtered, recovered and dried as in Example A–1) was 82. The filtrate from the reaction mixture was light green in color. The reaction mixture had no observable odor.

Example B–2 was run parallel and identical to Example B–1 with another 300-gram portion from the 1200-gram sample used in Example B–1 except that 15 grams of mercaptoacetic acid added as an 800 grams per liter aqueous solution, having a strong but not objectionable odor, was used in place of the alum. The reaction mixture had an observable, but not objectionable or strong, odor. The filtrate from the reaction mixture had no color. The G.E. brightness of the clay product (filtered, dried and recovered as in Example B–1) was 83.

Example B–3 was run parallel and identical to Example B–2 with another 300-gram sample as in Example B–2 except that only 0.9 gram of zinc hydrosulfite and 6 grams of mercaptoacetic acid were used. The filtrate from the reaction mixture had no color and the reaction mixture of clay and treating agents had an observable but not objectionable or strong odor. The G.E. brightness of the filtered, dried clay product was 82.

Example B–4 was run parallel to and identical to Example B–1 with another 300-gram sample, as in Example B–2, except that no alum was used. The G.E. brightness of the clay product was 82.

Examples C–1 through C–4

In Example C–1, 300 grams of a 900-gram sample of high color air floated Georgia kaolin clay (analysis in Table II) having a G.E. brightness of 82 was admixed with 700 grams of water at 60° C. as in Example A–1. The pH of the resulting slurry was 6.7. 1.5 grams of sodium hydrosulfite and 0.9 gram of alum were added to the slurry and admixed therewith for 30 minutes at 60° C. to form a reaction mixture in the same manner as in Example A–1. The G.E. brightness of the clay product was filtered, recovered, and dried as in Example A–1 and was 85.5.

In Example C–2, a second 300-gram portion of the 900-gram sample of high color clay used in Example C–1 was treated parallel and identical to test C–1 except that 6 grams of mercaptoacetic acid added as an 800 grams per liter aqueous solution was used, and zinc instead of sodium hydrosulfite was used. The filtrate from the reaction mixture was clear and had no color. The reaction mixture had an odor that was observable but not objectionable nor strong. The G.E. brightness of the clay produced was 88.

In Example C-3, 300 grams of a 600-gram sample of high color clay produced by froth flotation and having a G.E. brightness of 86 was admixed with 700 grams of water at 60° C. as a Test A-1. 0.9 gram of zinc hydrosulfite and 0.9 gram of alum were added to the slurry and admixed therewith for 30 minutes at 60° C. to form a reaction mixture in the same manner as in Example A-1. The filtrate from the reaction mixture had a light green color. The G.E. brightness of the product was 88.0.

In Example C-4, the remaining 300-gram portion of the 900-gram sample of high color clay used in Example C-1 was treated parallel and identical to Example C-3 except that 6 grams of mercaptoacetic acid was added as an 800 gram per liter aqueous solution, and zinc hydrosulfite was used. The filtrate from the reaction mixture was clear and had no color. The reaction mixture had an odor that was observable but not objectionable nor strong. The G.E. brightness of the clay produced was 90.0.

In Example C-5, 300 grams of a 600-gram sample of high color clay produced by water fractionation, analyses as in the Table II, and having a G.E. brightness of 82 was admixed with 700 grams of water at 60° C. as in Test A-1. 1.5 grams of zinc hydrosulfite and 0.9 gram of alum were added to the slurry and admixed therewith for 30 minutes at 60° C. to form a reaction mixture in the same manner as in Example A-1. The filtrate from the reaction mixture had a very light green color. The G.E. brightness of the product was 86.5.

In Example C-6, the other 300-gram portion of the 600-gram sample of high color water-fractionated clay used in Example C-5 was treated parallel and identical to Example C-5 except that 3.0 grams of mercaptoacetic acid, added as an 800-gram per liter aqueous solution, was used in addition to the alum.

The filtrate from the reaction mixture was clear and had no color. The reaction mixture had an odor that was observable but not objectionable nor strong. The G.E. brightness of the clay produced was 90.3.

In yet another example, C-7, of this invention a clay slurry was made up from a 300-gram portion of the same clay feed (G.E. brightness of 70) used in Example A-1. This portion was mixed and heated as in Example A-1 with 1.5 grams of zinc hydrosulfite and 0.9 gram of alum except that 3.75 cc. of an 800-gram per liter aqueous solution of thiomalic acid also was added thereto. The G.E. brightness of the clay product recovered and dried as in Example A-1 was determined as 85.5. The reaction mixture during the initial portion as well as in the final portion of the 30-minute reaction period did not have an objectionable or strong odor although initially an odor was observable. The filtrate of the reaction mixture in this example was initially clear and colorless and remained so for a period in excess of 24 hours.

Another example was run parallel and identical to Example C-7 except that 7.5 cc. of an aqueous solution of mercaptoethanol was used; the pH of the reaction mixture of clay, treating agents and water was 3.8. The reaction mixture, as in Example A-2, had an odor during the 30-minute reaction period that was observable but not objectionable. The filtrate of the reaction mixture was clear and colorless as in Example A-2. The G.E. brightness of the filtered clay product was 85.5.

In yet another procedure for improving the color of clays, the procedure of Example C-7 was repeated on the same low color crude (G.E. brightness of 70) using 15 grams of hydroxyacetic acid (in a 70% aqueous solution) in place of the 3 grams of mercaptoacetic acid aqueous solution there used. The resulting clay product had a G.E. brightness of 84.5. The procedure of Example C-6 was repeated using the same water-washed clay (G.E. brightness of 82.0) and using 15 grams of hydroxyacetic acid in place of the 3 grams of mercaptoacetic acid used in that example. The G.E. brightness of the product was 90.0.

After the bleaching operations as above described, the clay may be separated from the slip in any convenient manner and dried. The clay may be coagulated to improve its filtering characteristics.

It is, accordingly, seen that the process of this invention improves the color of high color clay crudes as well as intermediate and low color clay crudes. Also, such results are obtained without development of objectionable amounts of fumes even while operating from 60° to 80° C., notwithstanding the generally accepted malodorous characteristics of mercaptan reagents.

While not limiting the invention thereto, a theory of this invention, which is included within the scope of this invention, is that in conventional clay bleaching operations the reducing agent—as sulfoxylates as above defined —reduces water-insoluble colored ferric compounds carried by the clay and forms therefrom water-soluble ferrous compounds. The thus-solubilized iron is then partially reoxidized by air while in aqueous solution (which solution is in contact with the clay particles of the reaction mixture) or in contact with solution in contact with air, thus forming water-insoluble colored iron compounds which are readsorbed on the clay and cannot thereafter be removed by washing. According to this invention, however, notwithstanding the presence of air and agitation of such solution with air, the solubilized iron compounds produced as above described from the clay are brought into contact with an agent which forms a sufficiently stable combination therewith to prevent reoxidation of that reduced iron and so stabilizes the scavenging of such iron theretofore effected from the clay by the reducing agent.

A sufficiently stable combination to prevent such reoxidation in aqueous solution exposed to air is effected by the reaction of such solubilized iron with a water dispersible agent containing a mercapto radical and a radical chosen from the group consisting of hydroxyl and carboxyl radicals. Preferably such agent is a water-soluble acid—herein referred to as dibasic—containing a carboxyl and a mercaptan radical or group—preferably with the —SH radical or group in the alpha position relative to the carboxyl radical or group, such as in mercaptoacetic acid; such a mercapto-carboxy acid forms in aqueous solution a water-soluble, preferably, or at least a water-dispersible compound or complex of sufficiently slight degree of dissociation to prevent reaction of the iron and oxygen from the air in a reaction mixture such as in the above examples and so prevents oxidation and readsorption of said iron on the clay from which previously removed. The thus-held iron is readily removed from the clay, as by filtration. This admixture of such dibasic mercaptan acid and reducing sulfoxylate is effective at the relatively acid pH conditions at which such sulfoxylate is most effective to reduce iron compounds associated with even relatively acid reacting clays without producing an objectionable or strong odor.

Other acids and compounds which also form similarly water-soluble compounds with ferrous iron of sufficiently low degree of dissociation to prevent reoxidation of ferrous iron compounds to ferric iron compounds in presence of air, water, and clay as in the reaction mixtures of the examples above include thiomalic acid and mercaptoethanol. This is because it is within the scope of this invention that acids and salts producing water-soluble and water-dispersible iron compounds separable from clay and having a dissociation constant in the range of and less than that of the compounds formed by the anions of mercaptoacetic acid or thiomalic acid or mercaptoethal with ferrous iron, as in the complex formed therebetween in the above examples, may be used in place of mercaptoacetic acid in the procedures described in the above examples.

This invention also provides for a reclamation of the mercapto-carboxyl reagent and production of sulfoxy compounds at an extremely economic level useful in clay treatment as above whereby clay crudes of low, high, and intermediate color may be treated economically to improve their color. The overall process of this invention including this reclamation process is shown diagrammatically in FIGURE 1, which figure forms a part of this specification.

As shown in FIGURE 1, separation of the liquor of the clay slurry from the clay during the recovery of the clay provides a liquor which may be treated—as by $H_2S$ or $Na_2S$ or ammonia—to selectively precipitate the iron in a water-insoluble form as iron sulfide ($Fe_MS_N$) or iron hydroxide and so regenerate the water-soluble iron complexing agent as mercapto-carboxy acid (shown generally as HSRCOOH). Further, after removal of the resulting insoluble iron sulfide precipitate from said liquor, as by filtration and/or centrifugation, controlled oxidation of the resulting liquor as shown diagrammatically in FIGURE 1 converts any undesired excess $Na_2S$ or $H_2S$ required for iron removal to a reducing sulfoxy compound such as sulfoxylates (shown generally as $M_xS_yO_z$) and in the desired pH range. Such sulfoxy compounds, in combination with the reclaimed mercapto carboxy acid, such as mercaptoacetic acid, may be used again for brightening further portion of clay in the manner described in the above examples, such as A–2, B–2, and C–2.

The clay products of the process of this invention from which the iron has been scavenged, such as described in the above examples, are entirely amenable to incorporation with conventional rubber compound mixtures. For example, 104 parts by weight of the treated clay of Example B–2 with 100 parts GRS rubber, 5 parts zinc oxide, 3 parts sulfur, 2 parts accelerator (as N-cyclohexyl-2-benzothiazole sulfenamide) and 8.5 parts of softener, as polymers of indene and coumarone, produce, on a 60 minute cure, mechanically useful rubber compounds with strength characteristics of about 1700 p.s.i. tensile strength, 700% elongation, and a Goodrich tear test strength of 120 pounds per inch thickness.

The above invention is not to be considered as limited to the specific embodiments and theory disclosed as many variations and modifications of the process will be readily apparent to those skilled in the art, which modifications and variations are intended to be included within the scope of the appended claims.

We claim:

1. Process for the treatment of clay to improve the color thereof which comprises contacting an aqueous suspension of the clay with a reducing compound capable of reducing the ferric iron impurities of the clay to ferrous iron and then adding a water soluble polyfunctional organic chelating agent capable of forming a complex with the ferrous iron, said complex being separable from the clay and said chelating agent containing as one active radical, a mercapto group, and a second active radical selected from the group consisting of carboxy and hydroxy radicals, and finally separating the iron complex from the clay.

2. Process of treating a first portion of clay containing colored water insoluble ferric iron compounds comprising the steps of adding to an aqueous slurry of said clay, a mixture of a mercapto-carboxy acid capable of forming a complex with ferrous iron and a reducing compound capable of reducing the ferric iron of the clay to ferrous iron, reacting said mixture with said clay, separating the clay from the liquor, and treating said liquor with more than the amount stoichiometric to the complexed iron of a compound capable of forming an insoluble iron compound selected from the group consisting of sodium sulfide, hydrogen sulfide, and ammonia to separate all the iron from the complexing compound thereby regenerating the mercapto carboxy acid and separating the insoluble iron compound from the liquor.

3. A process for the treatment of clay in an aqueous suspension to improve the color of the clay, first contacting the aqueous suspension of the clay with a reducing compound capable of reducing the ferric iron impurities of the clay to ferrous iron and then adding a water soluble polyfunctional organic chelating agent capable of forming a complex with the ferrous iron, said complex being separable from the clay and having a dissociation constant no greater than the highest dissociation constant of a compound formed by the reaction between ferrous iron and a member selected from the group consisting of mercaptoacetic acid, thiomalic acid, and mercaptoethanol, said chelating agent containing as one active radical, a mercapto group and a second active radical selected from the group consisting of carboxy and hydroxy radicals, and finally separating the iron complex from the clay.

4. Process as in claim 1 wherein the agent is a water-soluble polybasic acid containing a carboxy group and mercapto group, one of said groups being in the alpha position with respect to the other.

5. Process as in claim 4 wherein the agent is mercaptoacetic acid and the treatment is carried out at an acid pH.

6. Process as in claim 4 wherein the agent is thiomalic acid and the treatment is carried out at an acid pH.

7. Process as in claim 4 wherein the agent is mercaptoethanol and the treatment is carried out at an acid pH.

References Cited by the Examiner

UNITED STATES PATENTS

| 1,588,956 | 6/26 | Feldenheimer | 23—110.2 |
|---|---|---|---|
| 2,339,594 | 1/44 | Williams | 23—110.2 |
| 2,339,595 | 1/44 | Williams | 23—110.2 |
| 2,500,727 | 3/50 | Whittaker | 23—110.2 |

FOREIGN PATENTS

| 2,309 | 1914 | Great Britain. |
|---|---|---|
| 886,653 | 1/62 | Great Britain. |

MAURICE A. BRINDISI, *Primary Examiner.*